United States Patent [19]

Kunkle

[11] 3,926,605
[45] Dec. 16, 1975

[54] METHOD AND APPARATUS FOR FORMING A RIBBON OF GLASS ON A MOLTEN METAL BATH

[75] Inventor: Gerald E. Kunkle, New Kensington, Pa.

[73] Assignee: PPG Industries, Inc., Pittsburgh, Pa.

[22] Filed: June 27, 1974

[21] Appl. No.: 483,508

[52] U.S. Cl. .............. 65/65 A; 65/99 A; 65/182 R
[51] Int. Cl.² ........................................ C03B 18/02
[58] Field of Search .............. 65/65 A, 99 A, 182 R

[56] References Cited
UNITED STATES PATENTS

| | | | |
|---|---|---|---|
| 3,420,647 | 1/1969 | Charnock | 65/99 A X |
| 3,520,672 | 7/1970 | Greenler et al. | 65/99 A X |
| 3,843,346 | 10/1974 | Edge et al. | 65/99 A X |

Primary Examiner—Arthur D. Kellogg
Attorney, Agent, or Firm—E. Kears Pollock

[57] ABSTRACT

An economical flat glass manufacturing process is disclosed wherein molten glass is delivered horizontally as a layer of glass onto the surface of a pool of molten metal and monotonically cooled while being attenuated to form a dimensionally stable, continuous sheet of glass which is then lifted upwardly and conveyed vertically upwardly from the pool of molten metal. The glass is further monotonically cooled until it is below the annealing point for the glass. The glass is cooled in such a manner that at the time of its lifting it is sufficiently viscous to prevent its further attenuation while being conveyed upwardly, and its major surface temperatures are sufficiently equalized so that permanent stresses are avoided in the glass.

29 Claims, 3 Drawing Figures

3,926,605

METHOD AND APPARATUS FOR FORMING A RIBBON OF GLASS ON A MOLTEN METAL BATH

CROSS-REFERENCES TO RELATED APPLICATIONS

This application is related to application Ser. No. 338,497, filed Mar. 6, 1973 entitled, "Manufacture of Glass by Contiguous Float Glass Process", filed by Charles K. Edge and Gerald E. Kunkle, the present applicant that application is now U.S. Pat. No. 3,843,346 issued Oct. 22, 1974. This application is also related to application Ser. No. 455,463 entitled, "Flat Glass Manufacturing Apparatus and Method", filed by Charles K. Edge and Gerald E. Kunkle, the present applicant.

BACKGROUND OF THE INVENTION

1. Field of the Invention

This invention relates to a method for the manufacture of a continuous sheet of flat glass by supporting molten glass on a pool of molten metal while forming and cooling glass. More particularly, this invention relates to a method for cooling the glass prior to, during and after lifting the glass from the pool of molten metal in order to produce annealed flat glass of high-surface quality while avoiding the introduction of permanent stresses into the glass.

2. Description of the Prior Art

Molten glass may be delivered onto molten metal and formed into a continuous sheet or ribbon of glass according to the teachings of Heal, U.S. Pat. No. 710,357 or of Hitchcock, U.S. Pat. No. 789,911 or according to the patents of Pilkington, U.S. Pat. No. 3,083,551 and U.S. Pat. No. 3,220,816. These patents describe processes in which molten glass delivery techniques vary. In one practice disclosed by Pilkington, molten glass is delivered through a long, narrow canal and over a lip from which the molten glass falls onto molten metal and spreads laterally outwardly on the molten metal for forming.

In the methods of Heal and Hitchcock, molten glass is delivered over a refractory bridge or wall onto molten metal. In the method of Heal the glass flows downwardly from a supporting bridge onto the surface of a pool of molten metal. In the method of Hitchcock, the molten glass is delivered substantially horizontally through an opening in a wall onto the surface of a pool of molten metal which is maintained at substantially the same elevation as the bottom of the opening in the wall over which the molten glass is delivered.

Following delivery of molten glass onto molten metal in the processes described above, the glass is advanced along the surface of the pool of molten metal as a layer and is cooled to form a dimensionally stable, continuous sheet or ribbon of glass. This is so in all of the described methods. In the methods of Hitchcock and Heal, the continuous sheet of glass is removed horizontally from the pool of molten metal and is thereafter conveyed away from the apparatus which is formed. In the process described by Hitchcock, an annealing chamber is provided so that the glass may be annealed while supported on a shallow segmented pool of molten metal. In the processes of Pilkington, the glass is removed from the pool of molten metal by lifting it slightly and supporting it on rolls to convey it away from the apparatus containing the pool of molten metal on which the glass is formed.

It has been published that a layer of glass may be removed from a pool of molten metal prior to being cooled sufficiently to become dimensionally stable and drawn vertically upwardly from the pool of molten metal to further attenuate and form a dimensionally stable ribbon of glass while drawing it upwardly. This is described in U.S. Pat. No. 3,233,995 to Javaux and in U.S. Pat. No. 3,420,647 to Charnock.

The patent to Javaux is primarily concerned with the production of flat glass having compositions that contain little fluxing material and melt at high temperatures. This patent describes forming flat glass on a bath of molten metal consisting of silver, gold or alloys of silver and gold so that the molten metal is one having a high melting point and is not easily oxidized at such a high temperature. Javaux, however, does teach that easily softened glasses such as soda-lime-silica glasses may be supported on such molten metals even though such glasses remain quite hot and fluid at the high temperatures at which the noble metal bath is maintained. Such glasses may be removed vertically from such a pool of molten metal before reaching dimensional stability and may then be drawn upwardly in the manner of the well-known Colburn process for drawing glass to form a thin sheet of glass while drawing the glass upwardly. This is shown in FIGS. 3 and 4 of the patent to Javaux and described therein as follows at Column 2, lines 35–40, "If the glass is soft glass it will be too viscous for handling and it will preferably be upwardly drawn from the bath into a thinner sheet and cooled to a temperature sufficiently low for engagement with rollers which can handle the cooled glass without damage to its fire-polished surfaces.", and at Column 4, lines 1–5, "At this temperature [800°C.], a sheet of soda-lime glass is subjected to a lesser lengthening during its upward movement toward roller 12' than in the case of a bath of silver or gold, and the cooling of the ascending sheet is reduced when compared to a bath of silver or gold." (Bracketed material added from prior sentence.)

The patent of Charnock is also concerned with the upward drawing of glass that is not yet formed as a dimensionally stable sheet. The glass is drawn upwardly from a supporting pool of molten metal to form the glass into a thinner than equilibrium sheet while drawing it upwardly. The patent of Charnock shows that the upward drawing of the incompletely formed sheet of glass may be accomplished, using a vertical conveying mechanism or using a drawing apparatus that has an initial vertical section followed by a turnover roll and a horizontal section.

While these two patents state that glass may be drawn upwardly from a pool of molten metal to form a continuous sheet of glass during such upward drawing, they are of little help in the consideration of improving techniques for lifting an already formed, dimensionally stable, continuous sheet of glass from the surface of a pool of molten metal upon which the glass has been formed.

In considering the overall problem of making a suitable flat glass product continuously, it is necessary to consider not only delivering a layer of molten glass onto molten metal, forming the glass into a continuous, dimensionally stable, sheet of glass, but also successfully annealing the glass so that it may be cut into usefully sized segments suitable for further treatment, fabrication and use. As indicated in the early patent to Hitchcock, he appreciated the necessity of annealing the glass formed according to this forming method.

Hitchcock provided for a fully integrated glassmaking process, including the step of annealing the glass.

It is generally necessary in the annealing of glass to provide for an extremely gradual cooling of the glass from near its forming temperature through its annealing range and to a suitably low temperature for handling and cutting, using conventional equipment for that purpose. Such annealing generally is time consuming. A typical lengthy approach for successfully annealing glass is that described by Adams and Williamson in the *Journal of the Franklin Institute*, Vol. 190, page 597–631 and pages 835–868, 1920. Their annealing procedure comprises two essential steps: first, holding or soaking the glass at a constant temperature high in the annealing range of the glass, and then cooling the glass from that temperature to a temperature below the lower limit of the annealing range with such cooling being carried out at a gradually increasing rate. Another method for annealing glass is that taught by Gardon in U.S. Pat. No. 3,251,671 which is a method for annealing glass which provides for initially cooling the glass at a relatively rapid rate and thereafter cooling the glass at a relatively slower rate through the annealing range.

The expressison "annealing range" is defined as the span of temperatures between the annealing point and the strain point of a glass (see ASTM Standard Definitions, ASTM Designation C 162–72, *American Society for Testing Materials*, 1916 Race Street, Philadelphia, Pa. The annealing point is the temperature of a glass at which internal stresses are substantially relieved in 15 minutes as determined by ASTM Test C 336–71. The strain point is the temperature of a glass at which internal stresses are substantially relieved in 4 hours as determined by ASTM Test C 336–71.

The annealing method of Gardon has been applied successfully to sheet drawing processes, such as the Pittsburgh process, wherein a continuous sheet of glass is drawn upwardly from a pool of glass and formed during such drawing. In sheet drawing processes, it is possible to draw a sheet of glass upwardly during forming a relatively high temperature while producing a continuous sheet of glass having fire-polished surfaces because contact between such surfaces and any solid object is avoided while the glass is soft. Forces for drawing the glass are provided through the glass itself as it is contacted by drawing rolls at lower temperatures high in the drawing machine. There is difficulty, however, in adequately annealing glass in such a machine and bringing the glass to a suitable temperature for cutting within a minimum distance of vertical travel so that a drawing machine may be conveniently sized. This has necessitated the limitation of sheet machine drawing speeds to less than about 100 inches per minute for the Pittsburgh process and less than about 75 inches per minute for the Colburn process when making glass having a nominal thickness of one-eighth inch. These speeds compare unfavorably with the formation speeds for manufacturing glass by conventional float processes which can operate at speeds on the order of 400 inches per minute when manufacturing glass having a nominal thickness of about one-eighth inch. Even so, a long, expensive annealing lehr is required for annealing glass that is formed by conventional float processes, and the glass must be lifted from a bath and delivered horizontally to such a lehr at a temperature within a critically narrow temperature range to prevent breaking or roll marking.

The present invention provides an economical method for making a continuous sheet of glass of desired thickness having superior surface characteristics and excellent anneal with relatively low uniform stresses at its surfaces.

SUMMARY OF THE INVENTION

A continuous sheet of flat glass is produced by a method including the following steps: a layer of molten glass is delivered onto the surface of a pool of molten metal maintained within a forming chamber. The molten metal is preferably tin, an allow of tin or some other metal having a specific gravity greater than glass, having a melting point lower than the glass to be formed, and being substantially non-reactive with the glass at its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. There are forces applied to the glass which are aligned substantially along its path and which cause it to be advanced in that path and to be attenuated or thinned during its advance. These forces, characterized as longitudinal tractive forces, may be applied to the glass at any location along its path. They are preferably applied to the glass at locations well along its path of advance and are transferred to the hotter, more fluid, glass primarily by the surface tension of the glass.

After the glass has been cooled sufficiently to become dimensionally stable (that is, it has reached its final width and thickness) it is advanced further along the surface of the molten metal a short distance and then is lifted from the surface of the pool of molten metal. It is lifted and conveyed upwardly from the pool of molten metal by applying a force to the sheet of glass at a location sufficiently above the pool of molten metal so that the means employed to apply such a force to the glass does not impart a permanent marking or imprint to the surface of the glass. In the practice of this invention, this force may be effectively transferred along the glass through the location of lifting and to hotter, more fluid, glass in the upstream region of the forming chamber so as to cause attenuation of the glass. The glass is conveyed upwardly along a path that forms an angle of at least about 60° with the horizontal surface of the pool of molten metal upon which the molten glass has been formed into a continuous sheet. Preferably, the glass is lifted and conveyed upwardly along a substantially vertical path that is from 80° to 100° from the horizontal path of the advancing glass prior to lifting.

In the practice of this invention, it is preferred that the layer of molten glass be delivered along a substantially horizontal path onto the pool of molten metal with the upper surface of the pool of molten metal upon which the glass is supported and maintained at substantially the same elevation as such delivery.

During the advance of the glass along the surface of the pool of molten metal, the temperature of the glass is adjusted and maintained at a plurality of discrete locations along its path so that the glass is continuously and monotonically cooled during its advance. Such cooling is characterized by the fact that the temperature of the glass at each of the discrete locations at which its temperature is adjusted and maintained is less than the temperature of the glass at the next previous discrete location and greater than the temperature of the glass at the next succeeding discrete location. In other words, as the glass moves from an upstream location to a downstream location through the forming chamber on the surface of the molten metal, its temperature continues to decline, and the glass is not subjected to reheat as in many conventional float processes. As a practical matter, it is difficult to measure the temperature of the glass at adjacent locations closer together than about six inches. Therefore, the glass will be detected to be undergoing monotonic cooling if the temperature of the glass measured and successive locations that are six inches apart and the measured temperatures indicate a continuing decline of temperature without any intervening measured temperature being greater than a preceding measured temperature. The glass temperature may be easily measured using a conventional pyrometer such as a Radiamatic$^{TM}$ pyrometer sold by Honeywell Co., Washington Park, Pa.

In the vicinity of the location where the glass is lifted from the surface of the pool of molten metal, its temperature is adjusted and maintained so that the glass temperature upon lifting is sufficient to prevent fracture of the glass due to such lifting, yet the glass temperature is below the temperature at which the glass may be observably attenuated within the time of upward conveyance by the force which is applied to the glass for conveying it upwardly. Since glass is an uncrystallized solid which can and does act as a viscoelastic material, given enough time and enough force the glass may be caused to thin even at extremely low temperatures well below the conventionally-known softening point of the glass. It is therefore important to note that the temperature is maintained at lifting below a temperature sufficient to cause the glass to be observably attenuated by the force applied for conveying the glass in the time provided for conveying the glass upwardly in this process. One of the advantages of this process over a conventional float process with horizontal removal of the glass is that the temperature range suitable for glass removal is extended considerably. While the lower limit of glass temperature for glass removal is only slightly below that at which glass can be successfully removed horizontally from a conventional float bath, the upper limit of glass temperature for successful vertical lifting is more than 100°F. above that at which glass can be successfully removed horizontally.

Following lifting of the glass from the surface of the molten metal, its temperature is adjusted and maintained at a plurality of discrete locations along its path of upward conveyance such that the temperature of the glass at each of the discrete locations is less than the temperature at the next previous discrete location and greater than the temperature at the next succeeding discrete location until the temperature of the glass is below the annealing point for the glass. The glass is, therefore, continuously and monotonically cooled from the location of lifting the glass from the pool of molten metal until the glass has been conveyed upwardly and cooled sufficiently to have a temperature at or below the annealing point of the glass. Again monotonic cooling may be detected by detecting glass temperatures at several locations along the path of glass conveyance, each location being about 6 inches or more from the previous location.

By cooling the glass sufficiently prior to lifting, one can be assured that the glass will not be thinned or attenuated during its upward conveyance. Instead, the glass will be caused to reach a stress equilibrium condition through its thickness, and the cooling of the glass after lifting is such that stresses associated with lifting the glass from the surface of the pool of molten metal will be fully relieved before the glass reaches its annealing point temperature. This may be determined by directing the coherent beam of a ruby laser through the glass at a low angle (less than five degrees from a surface) or through an edge and observing the light pattern formed in the glass. The light will appear as a segmented line with the length of the alternate light and dark portions corresponding to the magnitude of stress in the glass. The length of the segments must be calibrated with stress measurements made at room temperature compared with quartz wedge stress measurements. This insures, first, that the glass can be successfully annealed in a short distance and time and, second, that the glass will have been thoroughly set up at its surfaces to prevent any damage or marking to such surfaces during further conveyance upwardly for puproses of annealing and further processing of the glass. By providing such thermal treatment of the glass during its upward movement, glass may be produced at substantially higher speeds than possible in a sheet glass process, such as the Pittsburgh process, Colburn process or Fourcault process, and faster than glass may be produced in an apparatus of equivalent size according to the methods of either Charnock or of Javaux. Meanwhile, the glass may be produced at high speed, comparable with conventional float glass rates, without requiring the long annealing lehrs commonly used in conventional float glass plants.

In the practice of this invention, it is desirable to adjust or control the temperature of the glass so that its viscosity will be within the range from about $10^5$ to $10^{12.5}$ poises at the time of lifting. It is further desirable to adjust and maintain the temperature of the glass during its upward conveyance so that its temperature will be descreased sufficiently to cause its viscosity to be greater than about $10^{13}$ poises by uniformly cooling the glass at one rate of cooling and thereafter, while maintaining the glass in planar alignment, cooling it at a relatively more rapid rate while continuing to convey the glass upwardly, and then maintaining the glass in substantially planar alignment while cooling it relatively more slowly until its viscosity is greater than about $10^{14.5}$ poises. During the cooling of the glass as it is conveyed upwardly from the pool of molten metal, it is desirable to cool it sufficiently so that its viscosity is greater than about $10^{13}$ posies before the central portion of the sheet of glass is contacted by any solid object, particularly any object that contacts it with sufficient pressure to apply upward force to it. The glass, nevertheless, may be contacted at its edges by rolls substantially at or immediately above the location where it is lifted from the surface of the pool of molten metal. Such edge roll contact is, of course, well known in sheet drawing processes and is described in conjunction with vertical drawing processes where the glass has been supported on molten meta prior to drawing. Despite the fact that such edge rolls may be used in combination with the other elements of this invention, they are not essential to its success and their elimination eliminates the need for maintaining such devices and provides for the manufacture of a continuous sheet of glass having improved surface quality in the vicinity of its marginal edges. When producing glass according to this method with the preferred practice without edge rolls or other edge contacting means in the vicinity of a lift-off location, glass of high-surface quality extending to the bulb edges of the continuous sheet of glass is possible.

When the present method is employed to produce glass having a thickness substantially less than the thickness which would be obtained by the glass at equilibrium with the molten metal when it is supported by the molten metal, it is desirable to apply transverse, outwardly aligned forces to the glass substantially immediately following its delivery as it is being advanced and cooled. Such forces are effective to laterally or transversely attenuate or thin the glass. This may be, and preferably is, accomplished in a manner such that the width of the layer, and ultimately the sheet of glass, being advanced along the surface of the pool of molten metal is maintained substantially constant and equal to the width of the layer delivered onto the surface of the pool of metal. The outward transverse forces may be applied in a manner such that the width of the formed sheet of glass advancing along the surfaces of the molten metal prior to lifting is greater than or less than the layer of molten glass delivered to the surface of the molten metal.

In the practice of this invention, it is observed that the linear rate of glass advance substantially immediately before and after lifting is maintained substantially unchanged. For example, if a sheet of glass is advancing along the surface of a pool of molten metal at a linear rate on the order of 200 inches per minute at a location upstream from the location of lift-off about one-tenth to one-fourth of the length of glass advance from the location of delivery to the location of lift-off, the linear speed of upward conveyance of the continuous sheet of glass that may be detected at any convenient location will also be on the order of 200 inches per minute with the detected speeds agreeing with one another within plus or minus 5 percent of their average linear speed. When producing glass having a thickness on the order of 3/16 inch or less, the linear rate of glass advance substantially immediately following delivery onto the surface of the pool of molten metal is on the order of half the rate of glass advance substantially immediately before lifting a continuous sheet of glass from the surface of the pool of molten metal.

In another aspect of this invention, the control of glass speed is of prime concern. The need for carefully controlled monotonic cooling, while preferred, is less critical when proper glass speed relationships are maintained.

Glass speed may be detected at two locations along the flat portions of the path taken by a sheet of glass passing through this process, each location being equidistant from the intersection of the tangent lines extending from the relatively flat portions of the glass path and each location being substantially adjacent the location of tangency between such tangents and the glass. The glass peed may be detected at each location using a mechanically driven tachometer and a driving wheel of known circumference or by placing a mark on the glass and measuring the time for the mark to pass between two reference points a known distance apart. The glass should be advanced and conveyed so that the two speeds agree with one another to within 5 percent and preferably to within 1 percent of the average of the speeds.

By so controlling the speed at which the glass is advanced just prior to lifting and the speed at which the glass is conveyed just after lifting the glass sheet is prevented from either buckling or jerking during lifting while the radius of curvature of lift-off is kept small relative to the width of the sheet. This has the effect of stabilizing the sheet of glass and preventing it from vibrating or moving against either of the lowermost conveyor rolls with sufficient force to cause breakage of the glass at the conveyor rolls.

In yet another aspect of this invention wherein edge holding devices such as wheels or rolls are used to maintain or control the width of the sheet of glass being formed, the longitudinal linear speed of the final set of edge wheels is controlled to closely agree with the linear speed of the lowermost conveyor rolls. Thus, the speed of the glass at the final set of edge holding devices is controlled to be within the range of plus or minus 5 percent of the speed of the glass at the slowermost set of conveyor rolls. It is most convenient to detect the speeds of the edge rolls or wheels and of the conveyor rolls using tachometers or the like. Since the edge wheels are generally operated at an outward angle from the direction of glass movement, the linear conveyor speed is preferably maintained equal (plus or minus 5 percent — preferably 1 percent — of average) to the cosine of the final edge wheel angle multiplied by the linear speed of that edge wheel.

The lack of vertical attenuation characteristic of this process may be appreciated from the fact that in this process the linear speed of the horizontally advancing sheet of glass after the glass has attained its final thickness and width is substantially equal to the linear speed of the vertically conveyed glass when its temperature reaches its annealing point.

The present method has been found to be particularly suitable for producing thin, flat glass of soda-lime-silica composition. When producing such glass, the molten metal employed in the forming chamber consists essentially of tin and there is provided within the forming chamber and within the lower portion of the vertical conveying apparatus for conveying the glass upwardly from the pool of molten tip a protective atmosphere containing an inert gas such as nitrogen and oxygen scavenger such as hydrogen.

Forming chambers suitable for producing soda-lime-silica glasses may be quite short. By providing means for delivering molten glass onto molten metal along a substantially horizontal path, it is also possible to successfully construct and operate a forming chamber on the order of 10 feet long and 10 feet wide. Such a forming chamber may be conveniently constructed in place of a conventional Pittsburgh or Fourcault drawing kiln so that a Pittsburgh or Fourcault drawing machine may be employed as a conveyor for the glass. Thus suitable apparatus for forming glass according to this method may be easily and cheaply constructed to replace a drawing kiln of a sheet glass furnace in an existing factory. It is possible to take advantage of the presence of an existing glassmaking furnace, existing drawing machines, existing cutting equipment and an existing wareroom by converting a sheet glass factory to one employing this process.

In order to make a full range of flat glass products, it has been found desirable to construct a glassmaking facility having several forming chambers connected to a common furnace. The present process may be carried out successfully using a forming chamber connected to the refiner of an existing sheet glass furnace to which there are connected one or more sheet drawing kilns such as Pittsburgh drawing kilns. The present process is a sufficiently broad range of acceptable temperatures for delivering molten glass for forming so that sheet drawing kilns connected to the same refiner as the present forming chamber may be operated in the conventional manner with the molten glass in the refiner having its temperatures and flows controlled to satisfy the more sensitive and less stable sheet drawing processes being carried out from the drawing kilns.

It is more preferred, however, to employ a glassmaking facility having no sheet drawing kilns attached to the furnace but, rather, having several forming chambers of the present vertical lift-off kind or a combination of the present kind and one or more horizontal lift-off forming chambers of the contiguous forming kind described in application Ser. No. 338,497. A particularly preferred glassmaking facility comprises a furnace having a single end-connected, wide, horizontal lift-off forming chamber and one or more side-connected, vertical lift-off forming chambers. Such a facility is ideally suited for continuously producing a full range of flat glass products of differing widths and thicknesses. The most common thicknesses comprising the bulk of the facility's output may be produced on the wide, horizontal lift-off forming chamber with thickness changes being infrequent. The less common thicknesses may be produced in the smaller, vertical lift-off forming chambers and thickness changes may be made frequently for these chambers. Such frequent changes causes little loss of production since the residence time and heat capacity of the short, vertical lift-off forming chambers are small.

The forming chambers that are connected to the sides of a furnace, as well as any connected at an end wall, are preferably employed in conjunction with an apparatus for enhancing or accelerating glass flow into the forming chambers in the manner of the process described and claimed in application Ser. No. 338,497 now U.S. Pat. No. 3,843,346. Preferably, a submerged cooler extends across the opening into the forming chamber. The cooler is inserted in the pool of molten glass in the refiner of the furnace and beneath the elevation of the molten glass delivery means. Such coolers are particularly beneficial in converted sheet glass furnaces having relatively deep refiners and are most useful in furnaces serving sheet glass kilns in addition to one or more of the present forming chambers.

It has been found that desirable heat transfer rates are easily achieved in this process when glass is advanced from a delivery location to a lifting location, a distance from about one-half to 5 times its distance of upward conveyance from the lifting location to a location at which it is first contacted by a solid object, such as a roll for applying an upward force to it. Such an arrangement provides suitable space for accomplishing the necessary cooling in the desired manner. Characterizing the general process regions through which the glass passes when produced according to this method, it is seen that the glass passes horizontally through a delivery zone, then through an attenuation zone, and finally through a delivery zone, then through an attenuation zone, and finally through a thermal conditioning zone. It is then lifted and passes vertically through a cooling zone and ultimately through an annealing zone prior to being conveyed to a cutting location or to other further processing zones. In terms of suitable relative path lengths through these zones, the attenuation zone length should be from one-fourth to three-fourths the length of the entire horizontal, molten metal-supported path, that is, the combination of attenuation and conditioning zone. The cooling zone length should be from one-eighth and preferably from one-fourth to three-fourths of the total vertical zone length, the vertical zone comprising the cooling zone plus the annealing zone. It is desirable that the vertical zone be at least equal to and preferably longer than the horizontal zone and preferably less than twenty times the length of the horizontal zone. Following annealing, the glass may be conveyed upwardly for any convenient distance prior to cutting. When practicing this invention, it is possible to further increase the rate of production of a given sized forming chamber and conveyor (including annealing lehr) by capping or cutting the glass at temperatures on the order of 600° to 800°F., rather than at about 350°F. as is common for sheet glass processes. The glass, when cut, has lower stress than glass when cut following conventional sheet forming.

With the relatively small lower limit for the ratio of the lengths of the vertical zone and the horizontal zone, it will be observed that the present process could be conveniently fit into the space of an existing Colburn process just as it could be fit into the space of an existing Pittsburgh or Fourcault process. Following attenuation, the glass could be cut and laid over onto the existing horizontal run-out rolls of a Colburn apparatus. Thus, suitable apparatus could be placed at or just above the location of the turnover roll of a Colburn machine to cut and lay over discrete sheets of annealed glass produced according to the present method.

It is preferred in the practice of this invention that during the upward conveyance of the glass, as its temperature is adjusted and maintained prior to annealing, that it be cooled from both sides in a manner such that the temperature of each surface of the continuous sheet of glass approaches the same temperature as the glass is cooled to its annealing point.

The present process is characterized by a particularly desirable combination of conditions suitable for achieving and maintaining the flatness of a formed sheet of flat glass. In this process so long as the viscosity of the glass is sufficiently low to permit free flow, it is horizontally supported so that its stable equilibrium is a flat layer. Then, when the glass is cooled sufficiently so that it will not flow freely but is subject to visco-elastic response to imposed stresses, it is supported vertically. By supporting it vertically, it is subjected to symmetric cooling to cause it to be cooled through its visco-elastic range to its elastic (sub-stress point) condition without introducing asymmetric stresses into the glass. In contrast to this, each of the conventional glassmaking processes fails to provide an important part of the present combination.

Glass formed by a conventional float process is supported horizontally during forming so that its stable equilibrium condition is flat, but such glass, once formed, is conveyed from the forming chamber and cooled in an asymmetric thermal environment. Further, the glass must be cooled to a temperature within a narrow range to prevent marking by exit lift-off rolls and sagging between them. In order to accomplish this, the glass must be maintained on the surface of the pool of molten metal upon which it was formed long after forming has been completed. As a result, the electrochemical mass transfer, primarily of metals and alkali metals, between the glass and the forming chamber atmosphere and pool of metal continues for an extended time. As a result, the glass composition near the top (during horizontal advance) surface becomes substantially different from the glass composition near the bottom surface. Then during cooling the development of unbalanced stresses in the glass is enhanced because of such differing compositional characteristics of the glass through its thickness. The ultimate effect of this is the production of glass having undulating surfaces as evidenced by the visually observed distortion of light passing through the glass. Glass produced by the present process is less susceptible to distortion caused in this manner than is glass produced by conventional float processes.

Glass formed by a conventional sheet drawing process is supported vertically during initial forming. When so supported, the stable, equilibrium shape for the glass is a solid cylinder or rod rather than a flat layer. Thus, the forces applied to the glass for drawing it must overcome the surface tension forces tending to collapse the sheet into a cylinder as well as to draw and convey the sheet upwardly. The drawing forces must also overcome the surface tension forces tending to collapse the entire sheet and its meniscus into a flat, horizontal upper surface of the pool of molten glass in the drawing kiln. In order to maintain the shape of the drawn sheet, there must be a careful balance of drawing speed and temperature. Once formed, the sheet of glass is presented to a symmetric thermal environment. However, the advantages of symmetric cooling are somewhat offset by the fact that extremely rapid cooling occurs as the glass thins from a meniscus to a finished sheet. As a result, strong convection flows develop in the gaseous atmosphere surrounding the sheet of glass. This convection has local regions of greater and lesser cooling despite the general thermal symmetry of the environment. The glass is not uniformly cooled. As a result, the glass is characterized by surfaces that are not perfectly flat. The surfaces of the glass have undulating shapes causing distortion of light passing through the glass.

The present process is one in which the glass is supported horizontally during forming and is lifted and conveyed upwardly after cooling from its viscous range to its visco-elastic range so that the problems associated with the prior art processes are avoided. The glass is flattened completely and then kept flat by controlled cooling during upward conveyance. The excessive cooling necessary to overcome the heat radiated to a vertically drawn sheet from a hot meniscus and a molten pool of glass is avoided along with the attendant, nonuniform convection flows; yet, the glass is presented to a symmetric thermal environment not seen in the horizontal lift-off arrangements common for float processes.

The present process is superior to the sheet drawing processes of the prior art in that the refining, forming and annealing steps of the process are, in part, decoupled one from the other. This permits each step of the process to be optimized without jeopardizing the performance of the other steps. In a conventional sheet process, the temperature of the molten glass is a drawing kiln is at best a compromise between an ideal drawing temperature and an ideal temperature for supporting and conveying the glass upwardly for annealing. The temperature of the glass is also a compromise with the ideal temperature for refining glass prior to delivery for forming. In order to accommodate these competing requirements, sheet drawing processes are generally carried out using deep refiners connected to deep drawing kilns in which elaborate glass flows are developed by the careful placement of special "Kiln furniture" such as coolers and burners. Also, in order to produce glass of high quality, drawing speeds are generally much lower than the maximum drawing speed at which the glass could be conveyed. This is necessary to prevent the collapse of the ribbon or the development of substantial and nonuniform stresses in the glass. Also, such sheet drawing processes are inherently limited by a thickness-speed interaction that prevents the effective production of any thickness at any desired speed. In order to maintain the production of glass in such processes, the mass throughput (tonnage) for a given drawing kiln can be varied only slightly; to produce thick glass (greater than one-eighth inch) the drawing speed must be lower than to produce thin glass (less than one-eighth inch). In the present process the mass throughput may be varied over a wide range for the production of either thick or thin glass. Only the mechanical apparatus for handling the glass constrains the throughput.

Another advantage of the present process relative to sheet drawing processes is the more efficient utilization of heat (and, thus, fuel) supplied to a glassmaking facility operated in accordance with this invention. By converting a conventional sheet glass facility to a furnace having forming chambers such as described here connected to it and operating them in the manner described here, the heat utilization of the furnace can be improved from more than $10 \times 10^6$ BTU per ton of glass produced to less than $7.5 \times 10^6$ BTU per ton of glass produced.

As a variant of the preferred method of this invention, it is possible to cool the glass to a temperature such that its viscosity is greater than $10^{10}$ poises before lifting the glass so that some stresses will be imparted to the glass during its lifting although such stresses will be insufficient to fracture the glass. The glass is cooled from both sides just before and just after lifting it from the pool of molten metal such that the temperatures of both major surfaces of the glass are caused to approach the same temperature immediately prior to, during and immediately following lifting of the glass from the surface of the pool of molten metal. In this manner, even though stresses are introduced into the glass, those stresses are equalized so that, as the glass is further cooled, the stresses within the glass may relax in a uniform manner. The glass may then be suitably annealed to a desired final condition.

A particular advantage of this embodiment of this invention is that the annealing zone for the glass may be effectively extended downwardly into close proximity to the supporting pool of molten metal beyond the conveyor supported portion of the continuous sheet of glass. Thus, much of the space from the location of lifting the glass upwardly to the first supporting roll may be effectively used as part of the annealing zone, taking advantage of the ambient heat within the forming chamber. In this way the rate of glass production may be substantially increased while still producing glass having suitably low stress characteristics for cutting and handling. This invention will be further understood from the drawings accompanying this description.

DESCRIPTION OF THE PREFERRED EMBODIMENTS

Figure 1:
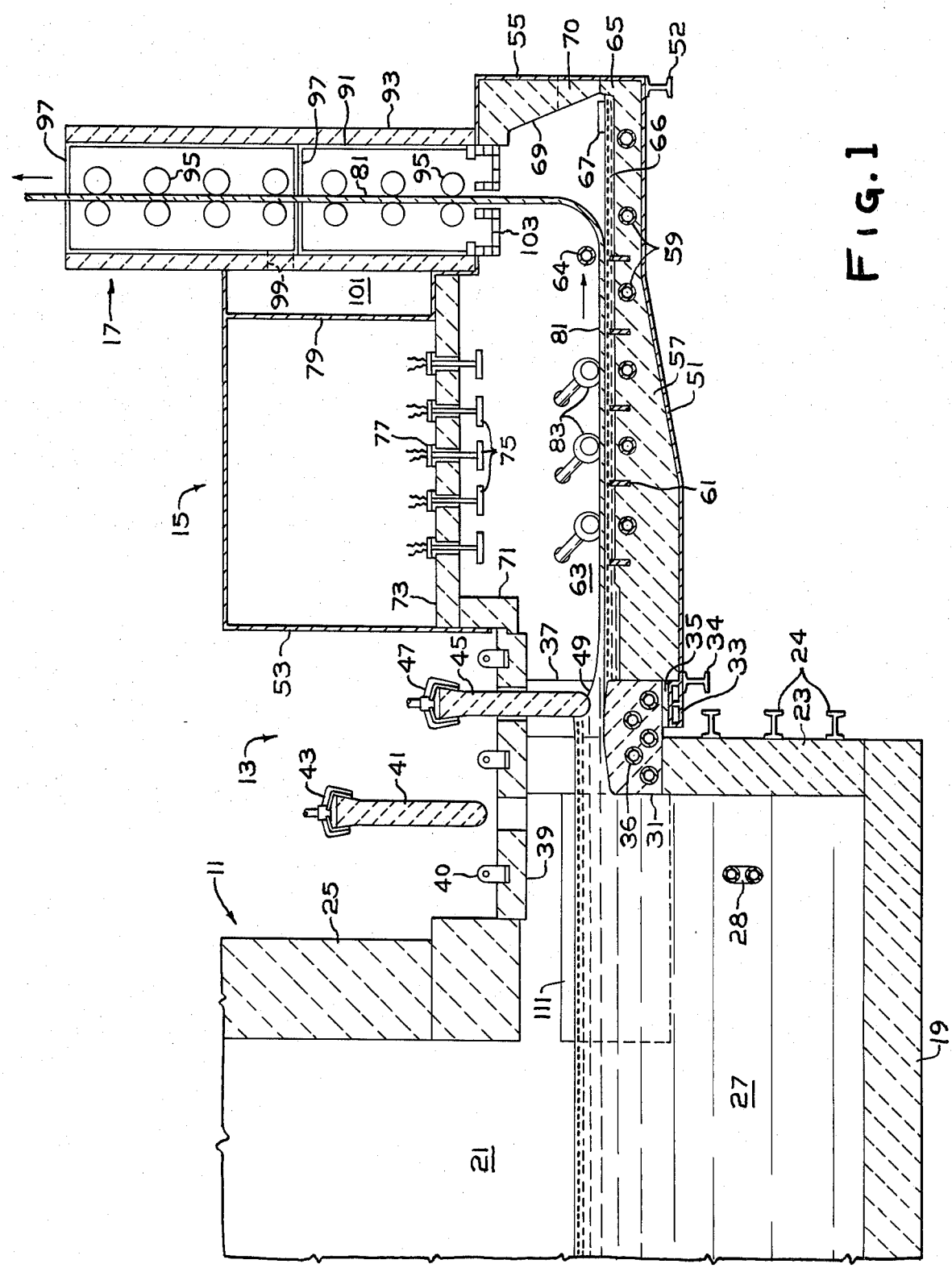
FIG. 1 is a sectional elevation of an apparatus for practicing this invention.
Figure 2:
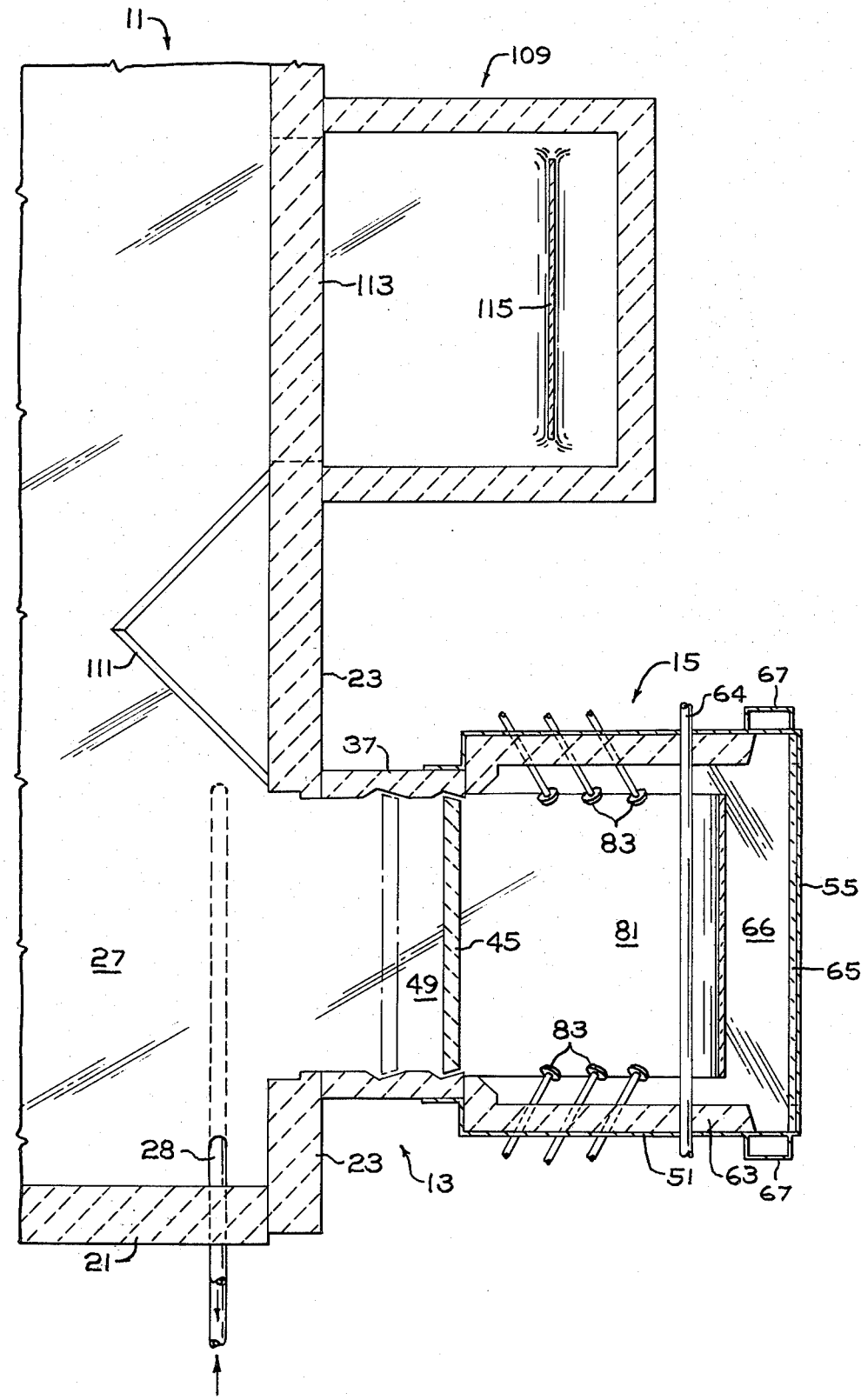
FIG. 2 is a partial sectional plan of an apparatus for practicing this invention shown in combination with a conventional sheet drawing kiln.

Referring now to FIGS. 1 and 2, there are shown two views of suitable apparatus for carrying out the present invention. The glass-making apparatus shown in FIGS. 1 and 2 comprises a furnace 11, delivery means 13 and a forming chamber 15 and a vertical conveyor 17 which may be, and preferably is, included in an annealing lehr.

The glassmaking furnace 11 which is shown in FIGS. 1 and 2 includes a melting section (not shown), and a refiner, the end of which is shown. The refiner or conditioning section of the furnace 11 comprises a furnace bottom 19, side walls 21 and a front basin wall 23. The front basin wall 23 is maintained in position by structural members 24. The furnace further comprises an upper front wall 25, which is preferably suspended or supported from above, and a roof overlying the upper portion of the furnace, the roof not being shown.

The delivery means 13 includes a threshold 31 resting on a cooling block 33 or other support which is supported by structural member 34. A cast refractory seal 35 or the like is disposed between the threshold 31 and the cooling box 33. Extending through holes in the threshold 31 are conduits or pipes 36 for transporting coolant or the like through the interior of the threshold 31 and for controlling its temperature during use. At the ends of the threshold 31 there are side wall portions or jambs 37 which define the sides of a channel through which molten glass may be delivered from the pool of molten glass 27 residing in the bottom portion of the furnace 11. The top of the delivery means 13 is defined by a roof 39, generally of flat arch construction, which is supported by supporting means (not shown) extending above it and connected to flat arch holders 40 embedded in the flat arch itself. Extending transversely across the delivery means 13 are two gates or tweels. The first is a backup tweel 41 connected to a support assembly 43 (not fully shown) for raising and lowering it into engagement with the molten glass in the pool of molten glass 27. The second tweel is a control tweel 45 supported by a support assembly 47 (not fully shown) for raising and lowering the tweel. The tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 52 in addition to support 34. This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious metal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperature of the forming chamber 15 at discrete locations along its length.

Also extending transversely along the forming chamber 15 are dams or weirs 61 mounted in the refractory bottom 57 and extending across its width. These dams are preferably inserted in slots and are held down at their ends at each side of the forming chamber. They are preferably constructed of a material that is less dense than the molten metal in the forming chamber so that their vertical position may be varied upwardly or downwardly by controlled adjustment of their holddown devices at their ends.

The forming chamber 15 further comprises refractory side walls 63 and a refractory exit lip 65. These, along with the bottom refractory 57 and the threshold 21, define a container in which a pool of molten metal 66, preferably molten tin or an alloy of tin, is disposed. At the downstream end of the forming chamber there are provided extensions 67 of the bottom container portion of the forming chamber which serve as cavities into which dross floating on the surface of the molten metal 66 may be drawn for removal from the forming chamber. The upper portion of the forming chamber includes an end wall liner 69, preferably constructed of refractory material. This liner 69 and the end casing 55 to which it is connected may include a suitable opening 70 through which a continuous sheet of glass may be withdrawn from the forming chamber along a substantially horizontal path in the event that such removal is desired. Generally, however, such an opening will be closed and sealed as shown. The upper portion of the chamber further includes a lintel 71 at its upstream or inlet end. This lintel 71 may be used as a means for uupporting the delivery means roof 39. Additionally, the upper portion of the chamber includes a ceiling or roof 73 preferably or refractory material which is suitable for radiating and absorbing heat uniformly over the area facing the glass beneath it during operation. Extending through the ceiling of the forming chamber are controllable heating elements 75 used to control the rate of heat removal from the glass during forming. These heating elements 75 are connected to bus bars 77 which are connected in turn to a source of power (not shown). The upper portion of the forming chamber 15 preferably includes a top casing end wall 79 which provides a space between the upper portion of the forming chamber 15 and the upstream or furnace side of the conveyor mechanism 17.

Advancing along the surface of the pool of molten tin 66 is a continuous sheet of glass 81 formed from the layer of molten glass 49 delivered onto the pool of molten tin for forming. The glass is preferably formed and delivered in the manner described in copending application Ser. No. 338,497 filed Mar. 6, 1973 now U.S. Pat. No. 3,843,346, however, the glass may be delivered and formed in any convenient manner, such as for example, the manner described in U.S. Pat. Nos. 3,083,551 and 3,220,816.

Extending into the forming chamber through its side walls are edge contacting devices for applying outward tractive forces to the layer of glass 49 during its advance along the surface of the pool of molten metal for forming. These devices are preferably driven wheels disposed and driven in such manner as to apply opposing outward forces to the glass to maintain its width during attenuation and to cause it to be attenuated to thicknesses less than that which would be attained by the glass if allowed to remain on the surface of the molten metal for sufficient time to come to equilibrium with it.

The vertical conveyor 17 comprises a machine casing 91 and thermally insulated machine walls 93. The machine walls 93 are preferably constructed of refractory material. Within the vertical conveyor there is a series of supporting rolls 95 for engaging a continuous sheet of glass 81 and for conveying it upwardly through the conveyor. These machine rolls are operated in a coordinated manner. They are used to apply sufficient tractive force to the glass to convey it upwardly and to transmit tractive forces along the glass downwardly and about the curved glass to the hotter, more fluid glass within the advancing layer of glass on the surface of the pool of molten layer in the forming chamber. Disposed across the internal space within the conveyor casing at several intervals along its length are machine seals 97 for retarding the flow of gases either upwardly or downwardly through the enclosed space surrounding the rolls 95. Extending through the walls of the enclosed conveyor are openings 99 through which cullet may be directed in the event the continuous sheet of glass is chipped or broken in an upper portion of the conveyor. A space is provided between the top casing of the forming chamber and the wall of the vertical conveyor for accommodating cullet removal. This space is characterized as a cullet chamber 101.

In a preferred embodiment of this invention, coolers 103 are disposed across the bottom of the vertical conveyor to control the removal of heat from a continuous sheet of glass 81 as it is conveyed upwardly from the surface of the pool of molten metal in the forming chamber.

Referring now specifically to FIG. 2 there is shown a glassmaking furnace 11 to which there is connected, in addition to a glass forming and conveying apparatus in accordance with this invention, a conventional sheet drawing kiln 109. The sheet drawing kiln and the delivery means 13 of the present apparatus suitable for carrying out the practice of this invention are separated from one another by a diverter 111 disposed within the refiner portion of the furnace 11. A conventional shut-off of 113 extends across the opening of the drawing kiln 109 and the location of a sheet of glass drawn from a meniscus 115 is shown in the drawing.

With an understanding of a suitable apparatus for use in practicing this invention, the method of making glass according to this invention may be readily appreciated. The following embodiment of this invention exemplifies it:

Raw batch materials are blended and fed along with cullet to the melter of a glassmaking furnace. These materials are melted to form a pool of molten glass, filling the lower portion of both the melter and refiner of the furnace. Molten glass flows from the melter to the refiner and, by control of temperatures within the pool of molten glass, convective flows also occur within the pool. As the molten glass passes through the refiner, it is gradually cooled and refined.

Molten glass is then delivered from the pool of molten glass 27, in the refiner 11 over the threshold 31 and onto the surface of the pool of molten metal 66 in the forming chamber 15. There, the delivered layer 49 of molten glass is advanced from the vicinity of the threshold 31 toward the location for lifting a sheet of glass 81 from the pool of molten metal. As the glass is advanced, it is gradually cooled and outward forces are applied to it by the rotation of the angled edge wheels 83. Water is directed through the pipes 59 embedded in the bottom 57 of the forming chamber 15 and the dams 61 are positioned so that their upper surfaces are in close proximity to the surface of the pool of molten metal. In this way the glass is uniformly cooled as it advances over the spaces between adjacent dams. The heating elements 75 in the ceiling 73 of the forming chamber form a matrix having at least three separately controllable heater zones across the width of the chamber. They are separately controlled to cause the central portion of the advancing layer of glass to cool at least as rapidly as the marginal portions of the advancing layer of glass.

The glass is steadily and monotonically cooled as it advances along the surface of the pool of molten metal. Shortly after the glass has passed from beneath the final pair of edge wheels, it has assumed its ultimate width and thickness and is sufficiently cooled as to lack susceptibility to further stretching or attenuation. The glass is then a dimensionally stable, continuous sheet 81 of glass.

As the dimensionally stable, continuous sheet 81 of glass is advanced along the surface of the pool of molten metal 66, it is further cooled, and desirably its temperatures at all locations through its thickness and across its width are caused to approach a common temperature by controllably cooling the glass from both above using cooler 64 and from below using the embedded coolers 59 in the vicinity of glass lift-off. In this way the glass will be substantially free of stress as it approaches the location at which it is to be lifted from the pool of molten metal. Desirably, the glass is cooled to a temperature such that its viscosity will be between $10^5$ to $10^{10}$ poises for lifting.

The dimensionally stable, continuous sheet of glass is then lifted upwardly from the surface of the molten metal and is conveyed upwardly a substantial distance before engaging a pair of conveying rolls which support and convey it. During this upward conveyance the sheet of glass passes between coolers 103 and is cooled sufficiently to prevent it from being marked when contacted by the rolls. The cooling of the glass is monotonic and gradual to cause the temporary stresses induced in the glass by bending as it is lifted to be fully relaxed before the glass is cooled to its annealing point. The glass is conveyed upwardly while being maintained in planar alignment during cooling. That is, the glass is kept flat during cooling.

After the glass is cooled to its annealing point, it is cooled relatively more rapidly than previously and cooling is then continued at that relatively rapid rate or at a lesser rate until the glass temperature falls below its strain point.

As the glass sheet is conveyed upwardly, it passes closely between several seals 97 extending from the conveyor walls 91 into close proximity to the sheet of glass. These seal members retard the ingress of ambient, oxygen-containing air into the forming chamber 15, particularly near the edges of the sheet where downdrafts are likely.

This invention will be further understood from the following specific examples:

EXAMPLE I

A small-scale pilot furnace and glass forming chamber are operated to produce a continuous sheet of flat glass, about six inches wide and any desired thickness. The metal used to support the glass for forming is tin and the space above the molten tin is filled with a mixture of nitrogen and hydrogen. The composition of the glass produced is as follows:

| | | |
|---|---|---|
| $SiO_2$ | 72.8 | percent by weight |
| $Na_2O$ | 13.7 | percent by weight |
| $K_2O$ | 0.02 | percent by weight |
| CaO | 8.8 | percent by weight |
| MgO | 3.8 | percent by weight |
| $Al_2O_3$ | 0.16 | percent by weight |
| $Fe_2O_3$ | 0.54 | percent by weight |

A layer of molten glass six inches wide and 0.49 inch deep is delivered onto molten tin in the forming chamber through the opening defined by a tweel, side jambs and an upwardly rounded threshold at the entrance end of the forming chamber. The molten glass just upstream of the tweel is maintained at a temperature of about 2065°F., and the threshold is maintained at a temperature of 1975°F. No edge wheels are used and the rolls in the vertical conveyor are operated to convey the finished sheet of glass upwardly at a rate of 20.5 inches per minute. The process throughput is about 2 tons per day. The temperature of the glass above the first pair of conveyor rolls is about 1210°F. The forces applied to the glass by the conveyor rolls not only convey the sheet upwardly but also advance the glass horizontally along the surface of the molten tin from the threshold. The molten glass is cooled as it is advanced along the molten tin for a distance of about 45 inches from the centerline of the tweel. It has become a dimensionally stable, continuous sheet of glass before advancing that far, and at that location, 45 inches from the tweel, it is lifted upwardly from the surface of the molten tin. The temperature of the glass just prior to lifting is about 1525°F. as measured using a radiation pyrometer. The thickness of the finished sheet of glass is 0.269 inch.

The extent of attenuation of the glass sheet and the location in the forming chamber at which such attenuation occurs are determined in the following manner. A square steel frame measuring 1 inch by 1 inch having an open center and mounted on a handle is dipped in powdered iron oxide (rouge) and a square pattern of iron oxide is deposited on the upper surface of the glass as it advances through the forming chamber by placing the frame momentarily against the glass (the procedure is analogous to branding techniques). The shape and dimensions of the "brand" or iron oxide pattern are observed in the finished sheet of glass.

A first brand or square pattern is placed on the glass at a location six inches from the tweel with two sides of the square aligned with the direction of glass advance. This brand is 1-11/16 inch long (in the direction of glass advance) and 13/16 inch wide (across the width of the sheet) in the finished sheet of glass. This indicates that the glass is being attenuated at a location 6 inches from the threshold.

A second brand is placed on the glass about 2 inches upstream from where the glass is lifted off the tin. The dimensions and shape of this brand are unchanged in the finished ribbon. This indicates that no attenuation of the glass occurs beyond the location 2 inches prior to lifting the glass.

EXAMPLE II

The procedures of the previous example are repeated except that two pairs of edge wheels are used. The first pair is positioned 17 inches from the tweel. Each wheel of the first pair is angled outwardly 20° from a line parallel to the direction of glass advance, and each is rotated at an outward linear speed of 18 inches per minute. The second pair is positioned 30 inches from the tweel. Each wheel of the second pair is angled outwardly 12°, and each is rotated at an outward linear speed of 43 inches per minute.

The molten glass is delivered to the molten metal as a layer 0.331 inch deep and 6 inches wide (about 2.1 tons per day). The glass temperature just upstream of the tweel is about 2060°F. The threshold temperature is 2040°F. The glass is cooled to a temperature of about 1650°F. just prior to lifting and to a temperature of about 1125°F. just following passage between the first pair of conveyor rolls. The thickness of the final sheet of glass is about 0.105 inch.

A 1 inch-by-1 inch brand placed on the glass 11 inches from the tweel elongates to 2¼ inches long and narrows to ⅝ inch wide in the final sheet of glass. A similar brand placed 20 inches from the tweel is elongated to 1⅝ inches in the final sheet of glass. A brand of similar dimension is placed diagonally (all sides 45° from edge of glass) on the glass 32 inches from the tweel. The dimensions of this brand remain unchanged in the finished sheet of glass but its internal angles nearest the edges of the sheet are changed from 90° to 100° and its upstream and downstream internal angles are changed from 90° to 80°. A final brand is placed on the glass 2 inches from the lifting location and 43 inches from the tweel. This brand remains unchanged in size and dimension in the finished sheet of glass.

The observations of the brands indicate that complete attenuation of the glass has occurred well before the glass is lifted up from the surface of the pool of molten tin in the forming chamber. This, in addition to the glass temperatures that are observed, indicates that the glass is not reheated so as to be subjected in any location in the vicinity of its lift-off location or along its path of vertical conveyance.

EXAMPLE III

The operational procedures of the previous example are followed. Glass is produced at a rate of 1.85 tons per day. The thickness of the glass being produced is 0.140 inch. Glass temperature measurements are made after graphite dams in the molten tin are adjusted to positions close to the surface of the molten tin and as water is directed through the embedded pipes in the bottom of the forming chamber to control the rate of cooling of the glass during its absence along the pool of molten tin. The coolers which surround the sheet of glass above the pool of molten tin are also operated to further control the cooling of the sheet of glass. The temperatures of the sheet of glass at several locations along its horizontal and vertical path are noted in the following table:

TABLE I

| | Distance along Path from Tweel (Inches) | Time since Delivery (Seconds) | Temperature of Glass (°F.) |
|---|---|---|---|
| | 2 | 7 | 1975 |
| | 6 | 20 | 1900 |
| | 12 | 30.6 | 1850 |
| Horizontal | 18 | 41.2 | 1800 |
| Advance | 24 | 51.8 | 1750 |
| | 30 | 52.4 | 1700 |
| | 36 | 73.0 | 1650 |
| | 42 | 83.6 | 1600 |
| Lift-off (45 in.) | | | |

TABLE I-continued

|  | Distance along Path from Tweel (Inches) | Time since Delivery (Seconds) | Temperature of Glass (°F.) |
|---|---|---|---|
|  | 48 | 94.2 | 1440 |
|  | 54 | 104.8 | 1280 |
|  | 60 | 115.2 | 1125 |
| Vertical | 66 | 125.8 | 1070 |
| Conveyance | 72 | 136.4 | 1015 |
|  | 78 | 147.0 | 960 |
|  | 84 | 157.6 | 910 |
|  | 90 | 168.2 | 865 |

From the observations of the previous examples as well as this example, it is noted that the attenuation zone extends to about 32 inches along the path; the thermal conditioning zone, 13 inches (from 32 inches to 45 inches); the cooling zone, 24 inches (from 45 inches to 69 inches); and the annealing zone, 24 inches (from 69 inches to 93 inches). The viscosity of the glass at the termination of each zone is that set forth above and may be readily determined using Fulcher's equation.

The glass that is produced is easily cut, has minimal internal stress as detected by quartz wedge technique and is relatively free of surface-related optical distortion.

EXAMPLE IV

The operational procedures of the previous examples are repeated except that the molten glass is delivered as a layer 0.240 inch deep and no edge wheels are used. Glass having a thickness of 0.240 inch is produced at a rate of 2.41 tons per day.

The temperatures of the sheet of glass at several locations along its horizontal and vertical path are noted in the following table:

TABLE II

|  | Distance along Path from Tweel (Inches) | Time since Delivery (Seconds) | Temperature of Glass (°F.) |
|---|---|---|---|
|  | 2 | 4 | 1900 |
|  | 6 | 12 | 1860 |
|  | 12 | 24 | 1800 |
| Horizontal | 18 | 36 | 1740 |
| Advance | 24 | 48 | 1680 |
|  | 30 | 60 | 1620 |
|  | 36 | 72 | 1560 |
|  | 42 | 84 | 1500 |
| Lift-off (45 in.) |  |  |  |
|  | 48 | 96 | 1360 |
|  | 54 | 108 | 1220 |
|  | 60 | 120 | 1080 |
| Vertical | 66 | 132 | 1025 |
| Conveyance | 72 | 144 | 980 |
|  | 78 | 156 | 935 |
|  | 84 | 168 | 895 |
|  | 90 | 180 | 860 |

Figure 3:
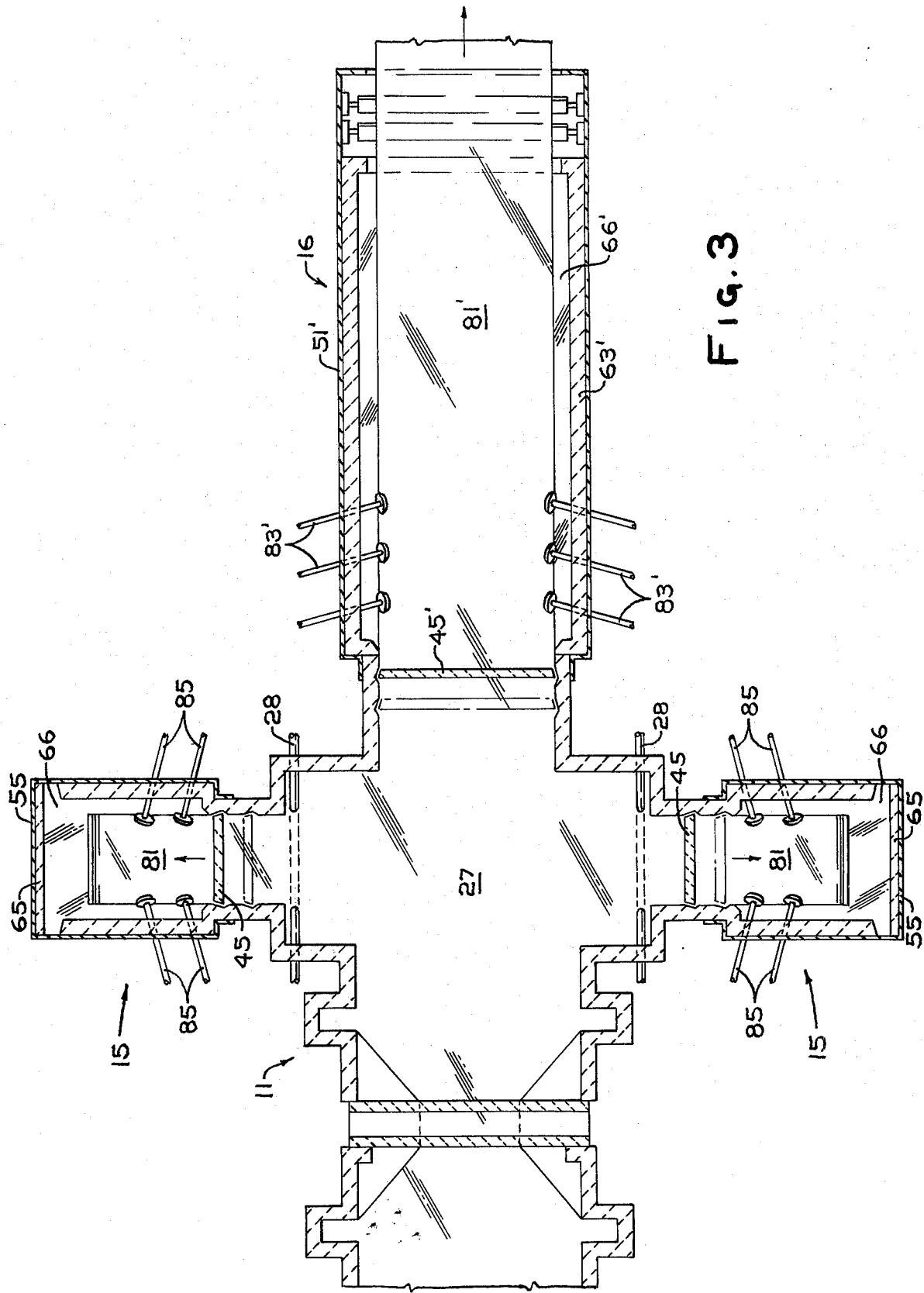
FIG. 3 is a partial sectional plan of a glassmaking furnace having two side glass forming chambers and a front glass forming chamber.

Referring now to FIG. 3, there is seen another embodiment of this invention. A glassmaking facility is shown which comprises a furnace 11 including a member and refiner with three flat glass forming chambers connected to it. Two glass forming chambers 15 are connected to the refiner of the furnace 11 through its side walls. One glass forming chamber 16 is connected to the refiner of the furnace 11 through its front wall. The side-forming chambers 15 are of the kind already described. The front forming chamber 16 is of the kind described in application Ser. No. 338,497.

Molten glass is delivered from a pool of molten glass 27 in the refiner to the side forming chambers 15 and there it is formed into a continuous sheet of flat glass 81. The molten glass delivery is controlled by a tweel 45, and the glass is outwardly constrained by edge wheel apparatus 85 during forming. During forming the glass 81 is supported on molten metal 66 which is contained within the refractory liner 65 of the forming chamber casing 55.

Prior to delivery to the forming chamber the molten glass in the refiner is subjected to thermal conditioning to controllably maintain its temperature and to control and enhance its flow into the forming chamber. This is preferably accomplished by providing a submerged coolers 28 across the entrances of the side forming chambers 15.

A forming chamber 16 having a substantially horizontal lift-off for glass at its exit end is connected to the refiner through its front wall. This forming chamber has at its entrance end a molten glass delivery facility including a tweel 45' for controlling the rate at which a layer of molten glass is delivered for forming. The bottom of the forming chamber includes a casing 51' having a refractory liner 63' containing a pool of molten metal 66' for supporting the glass during the forming of a continuous sheet of glass 81'. During such forming the glass may be outwardly constrained by forces applied to it by edge wheels 83' or other edge constraining devices. Once formed the glass sheet 81' is advanced along the surface of the pool of molten metal 66' and cooled until its temperature is sufficiently low as to avoid ready marking by contact with a solid object and to avoid substantial sagging between support points if supported in a horizontal position. The sheet of glass 81' is then lifted slightly (5° to 20° from the horizontal) over an exit lip and onto the first of a series of conveyor rolls called "lift-out" rolls. The sheet of glass 81' is then permitted to again assume a horizontal position as it is conveyed from the forming chamber to an annealing lehr.

A glassmaking facility having a furnace such as just described is well suited for the production of a variety of flat glass products to supply many differing market needs. Also, the space of a plant site is efficiently utilized by a glassmaking facility of this kind. The two side forming chambers produce glass sheets that are conveyed upwardly to cutting and processing floors located above the end forming chamber and its subsequent annealing lehr. Cooling conveyors carrying cut cap sizes of glass sheets from the side forming chambers may run over the space above the end forming chamber and its lehr to utilize the waste heat rising from them to gradually cool the glass in a controlled thermal environment. Meanwhile, the glass sheet from the end forming chamber may proceed at the lower elevation to cutting and processing stations. The glass from the side forming chambers may be conveyed after cutting down to the lower elevation to meet the glass from the end forming chamber in a common packing and shipping area. This provides substantial flexibility for filling orders for mixtures of glass sizes and thicknesses.

While the several embodiments of this invention have been described and illustrated by reference to detailed specific examples, those skilled in the art will recognize that variations may be made from the described methods and devices without departing from the substance of this invention.

I claim:

1. A method of making a sheet of glass comprising the steps of
   a. delivering a layer of molten glass onto the surface of a pool of molten metal along a substantially horizontal path and maintaining the surface of the pool of molten metal at substantially the elevation of glass delivery;
   b. advancing the glass along the surface of the pool of molten metal while cooling it and applying forces to it to advance it and to form a continuous sheet of glass, wherein said cooling is adjusted and maintained at a plurality of discrete locations along the path of advance of the glass such that the temperature of the advancing glass is progressively decreased sufficiently to cause the glass, while yet advancing along the surface of the pool of molten metal, to be sufficiently viscous to maintain dimensional stability of its width and thickness;
   c. lifting the cooled viscous glass substantially vertically upwardly from the surface of the pool of molten metal and conveying it substantially vertically upwardly therefrom at a speed substantially equal to the speed of glass advance along the surface of the pool of molten metal in a region where the advancing glass is sufficiently viscous to maintain dimensional stability such that the lifted glass retains the width and thickness achieved prior to lifting; and
   d. progressively cooling the dimensionally stable sheet of glass while conveying it substantially vertically upwardly at substantially constant speed.

2. The method according to claim 1 wherein, during upward conveyance of the dimensionally stable sheet of glass, it is progressively cooled until its temperature is below the annealing point of the glass.

3. The method according to claim 1 wherein, in the step of adjusting and maintaining the temperature of the glass during upward conveyance, the temperature of the glass is adjusted and maintained at the final discrete location at a temperature such that its viscosity is greater than about $10^{13}$ poises and thereafter, while maintaining the glass in planar alignment, the glass is cooled at a relatively rapid rate, and then at a relatively slower rate until its temperature is such that its viscosity is greater than about $10^{14.5}$ poises.

4. The method according to claim 3 wherein the glass is cooled sufficiently so that its viscosity is greater than about $10^{13}$ poises before the central portion of the sheet of glass is contacted by any upward force applying means for conveying it upwardly.

5. The method according to claim 1 wherein during the step of advancing the glass along the surface of the pool of molten metal the forces applied to the glass include forces applied at a plurality of discrete locations along its path of advance which are sufficiently large, outwardly aligned tractive forces to cause the glass to develop a dimensionally stable thickness less than that attained at equilibrium with the molten metal.

6. The method according to claim 5 wherein, during the advance of the glass along the surface of the pool of molten metal, the width of the glass is maintained substantially constant.

7. The method according to claim 5 wherein the speed at which the glass is conveyed upwardly is adjusted and maintained to be substantially equal to the speed of advance of the glass along the surface of the pool of molten metal at the discrete location along its path of advance closest to the location at which the glass is lifted where the last outwardly aligned tractive force is applied to the glass.

8. The method according to claim 7 wherein the linear rate of glass advance substantially immediately before lifting is maintained at least about twice the rate of glass advance substantially immediately following delivery onto the surface of the pool of molten metal.

9. The method according to claim 1 wherein the glass is a soda-lime-silca glass and the molten metal consists essentially of tin.

10. The method according to claim 1 wherein the glass is advanced from delivery until lifting a distance of from 0.5 to 5 times the distance of its upward conveyance from lifting to the location at which the central portion of the sheet of glass is first contacted by a solid object.

11. The method according to claim 1 wherein during the upward conveyance of the glass its temperature is adjusted and maintained such that its major surfaces are at substantially the same temperature substantially immediately prior to and during cooling to the annealing point of the glass.

12. In a method of making glass comprising the steps of delivering a layer of molten glass onto the surface of a pool of supporting molten metal; advancing the layer of glass along the surface of the pool of molten metal while cooling it and applying forces to it to form a continuous sheet of glass; lifting the continuous sheet of glass upwardly from the surface of the pool of molten metal; and conveying the continuous sheet of glass upwardly from the pool of molten metal by applying a force to the glass; the improvement comprising
   a. delivering the layer of molten glass along a substantially horizontal path and maintaining the surface of the pool of molten metal at substantially the elevation of such delivery;
   b. adjusting and maintaining the temperature of the glass at a plurality of discrete locations along its path of advance along the surface of the pool of molten metal such tht the temperature of the glass at each of the plurality of discrete locations is less than the temperature of the glass at the next previous discrete location and greater than the temperature of the glass at the next succeeding discrete location until the temperature of the glass is such that its viscosity is greater than $10^{10}$ poises;
   c. continuing to advance the glass at a viscosity greater than $10^{10}$ poises along the surface of the pool of molten metal while cooling the glass and adjusting and maintaining the rate of heat removal from the glass from above and from below such that the top and bottom surfaces of the glass are both caused to approach the same temperature when lifting the glass;
   d. cooling the glass from both sides while conveying it upwardly substantially immediately following lifting such that the temperature of each of the major surfaces of the glass is maintained substantially equal to that of the other major surface at each of a plurality of discrete locations along a substantially vertically its path of upward conveyance until the temperature of the glass is such that its viscosity is greater than about $10^{13.5}$ poises; and thereafter
   e. cooling the glass while continuing to convey it substantially vertically upwardly until the viscosity of the glass is greater than about $10^{14.5}$ poises.

13. The method according to claim 12 wherein the temperature of the glass is adjusted and maintained during lifting by a cooler disposed in the immediate vicinity of the upper surface of the glass.

14. In a method of making glass comprising the steps of delivering a layer of molten glass onto the surface of a pool of supporting molten metal; advancing the layer of glass along the surface of the pool of molten metal while cooling it and applying forces to it to form a continuous sheet of glass; lifting the continuous sheet of glass upwardly from the surface of the pool of molten metal; and conveying the continuous sheet of glass vertically upwardly from the pool of molten metal by applying a force to the glass; the improvement comprising a. controlling the speeds of advancing and conveying the sheet of glass to balance them and provide for maintaining substantially constant linear speed of the sheet of glass during lifting;
 b. controlling the temperature of the glass as it is advanced along the molten metal to establish and maintain it in a sufficiently viscous state prior to lifting to provide it with dimensional stability of width and thickness; and
 c. controlling that temperature of the glass while conveying the sheet of glass vertically upwardly to maintain the thickness and width of the sheet of glass substantially unchanged while it is conveyed vertically upwardly.

15. The method according to claim 14 wherein the glass is delivered onto the surface of the pool of molten metal along a substantially horizontal path as the surface of the pool of molten metal is maintained at substantially the same elevation as a glass supporting member for supporting the glass during its delivery.

16. The method according to claim 14 wherein the width of the sheet of glass is maintained substantially unchanged from the width of the layer of molten glass delivered onto the surface of the pool of molten metal.

17. In the method of making glass according to claim 14, controlling the speeds of advancing and conveying the sheet of glass by
 adjusting and maintaining the speed of conveying the sheet of glass upwardly within a range of from 0.95 to 1.05 times the speed that the glass advances along the surface of the pool of molten metal at a location substantially adjacent the location at which the sheet of glass is lifted from the surface of the pool of molten metal.

18. The method according to claim 17 wherein the speed of upward conveying is adjusted and maintained by adjusting and maintaining the linear speed of a conveyor roll for engaging the sheet above the surface of the pool of molten metal.

19. The method according to claim 18 wherein the speed at which the glass is conveyed upwardly is from 0.99 to 1.01 times the speed at which the glass is advanced.

20. In a method of making glass comprising the steps of delivering a layer of molten glass onto the surface of a pool of supporting molten metal; advancing the layer of glass along the surface of the pool of molten metal while cooling it and applying forces to it to form a continuous sheet of glass; lifting the continuous sheet of glass upwardly from the surface of the pool of molten metal; and conveying the continuous sheet of glass substantially vertically upwardly from the pool of molten metal by applying a force to the glass; the improvement comprising a. applying a plurality of outward tractive forces to the glass at a plurality of locations during its advance along the surface of the pool of molten metal;
 b. progressively cooling the advancing glass at a rate sufficient to cause the glass to be sufficiently viscous to have a dimensionally stable width and thickness at the location at which the last of the plurality of outward forces is applied to it; and
 c. controlling the speed of the advancing glass at the location of applying the last of the outward tractive forces such that the advancing glass has a speed of advance at that location that is substantially equal to the speed at which the continuous sheet of glass is conveyed upwardly from the pool of molten metal such that its dimensional stability is maintained as it is conveyed upwardly.

21. The method according to claim 20 wherein at the last location of applying outward tractive forces to the glass the speed of glass advance is controlled to be from about 0.95 to about 1.05 times the speed at which the continuous sheet of glass is conveyed upwardly from the pool of molten metal.

22. The method according to claim 20 wherein the outward tractive forces applied to the glass during its advance are sufficient to maintain the width of the advancing layer of glass as great as the width of the layer of molten glass delivered onto the surface of the pool of molten metal while the speed of the advancing glass is sufficient, in combination with the outward tractive forces, to cause the thickness of the continuous sheet of glass formed to be less than the thickness attained by such glass supported on and maintained at equilibrium with such a pool of molten metal.

23. The method according to claim 22 wherein the outward tractive forces and the speed of the advancing glass are sufficient to cause the sheet of glass formed to have a thickness less than about one-eighth inch thick.

24. The method according to claim 20 wherein said application of outward tractive forces and said control of the speed of glass advance are accomplished by engaging the marginal portions of the advancing layer of glass with rotatable wheels or rolls so oriented that their planes of rotation are angled outwardly from the path of glass advance and rotating the wheels or rolls at a sufficient speed while maintaining their outward angles sufficiently great to cause the component of the wheel or roll speed aligned with the path of the advancing glass to be the speed at which the continuous sheet of glass is conveyed upwardly and to cause the component of wheel or roll speed normal to the path of the advancing glass to be sufficient to maintain the width of the glass during its advance.

25. The method according to claim 24 wherein the speed and angle of rotation of the wheels or rolls are adjusted and maintained to maintain the width of the formed continuous sheet of glass substantially equal to the width of the layer of molten glass delivered onto the surface of the pool of molten metal for forming.

26. An apparatus for making flat glass comprising a glassmaking furnace for supplying molten glass for forming, means for delivering molten glass for forming from the furnace, a glass forming chamber for forming a continuous sheet of glass connected to the glassmaking furnace through the molten glass delivery means; and means for lifting and conveying a formed continuous sheet of glass upwardly from the forming chamber; wherein said forming chamber comprises an enclosed chamber having in its upper portion a space for containing a protective non-oxidizing atmosphere and having in its bottom portion a pool of molten metal for supporting glass during forming, the pool of molten metal having an upper glass-supporting surface at substantially the same elevation as a glass supporting member of said molten glass delivery means; means for advancing the glass along the surface of the pool of molten metal and a plurality of edge rolls for applying sufficient outward transverse forces to the glass during its advance to cause it to develop a desired width and thickness; means for adjusting and maintaining the temperature of the advancing glass at a plurality of locations along its path of advance, said means being suited to cool the glass to a temperature at which it is sufficiently viscous to maintain the developed width and thickness as dimensionally stable width and thickness and means for cooling the continuous sheet of glass sufficiently substantially immediately prior to lifting to maintain it sufficiently viscous during lifting so that its dimensional stability is maintained as it is lifted; and wherein said glass conveying means comprises means for conveying the continuous sheet of glass substantially vertically upwardly at the speed of glass advance substantially immediately prior to lifting; and means for uniformly cooling the glass to its annealing point while conveying it upwardly.

27. The apparatus according to claim 26 wherein said forming chamber includes means of adjusting and maintaining the temperatures of the surfaces of the glass substantially equal in the vicinity of the location where the sheet of glass is lifted from the surface of the pool of molten metal.

28. The apparatus according to claim 27 wherein said temperature adjusting means comprises a cooler disposed transversely across the forming chamber above the location for lifting the sheet of glass and between the location for lifting the sheet of glass and the location of the means for applying outward transverse forces to the glass and a cooler disposed transversely across the bottom portion of the forming chamber beneath the location for lifting the sheet of glass.

29. The apparatus according to claim 26 wherein said means for advancing the glass and for applying outward transverse forces to the glass during its advance comprises glass engaging, rotatable wheels in paired relationship for engaging the opposite marginal portions of the advancing glass, said wheels being angled outwardly and rotatable at sufficient speed for applying outward transverse forces to the glass while controlling its speed of advance to from about 0.95 to about 1.05 times the speed of conveying the sheet of glass upwardly from the pool of molten metal.

* * * * *

UNITED STATES PATENT OFFICE
CERTIFICATE OF CORRECTION

PATENT NO. : 3,926,605
DATED : December 16, 1975
INVENTOR(S) : Gerald E. Kunkle

It is certified that error appears in the above–identified patent and that said Letters Patent are hereby corrected as shown below:

Column 22, line 42, "tht" should be --that--.

Column 22, line 63, "vertically" should be --vertical--.

Column 22, line 63, "its" should be deleted.

Signed and Sealed this twentieth Day of April 1976

[SEAL]

Attest:

RUTH C. MASON
Attesting Officer

C. MARSHALL DANN
Commissioner of Patents and Trademarks